Oct. 25, 1960  P. V. TERRY  2,957,743
PRINTING DEMAND METER
Filed Oct. 4, 1957  4 Sheets—Sheet 1
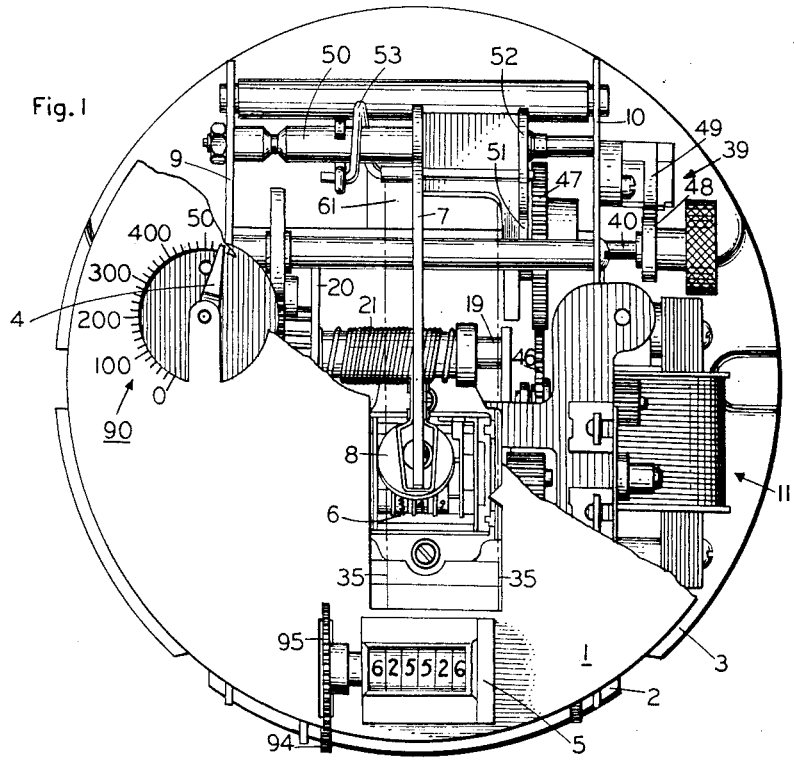
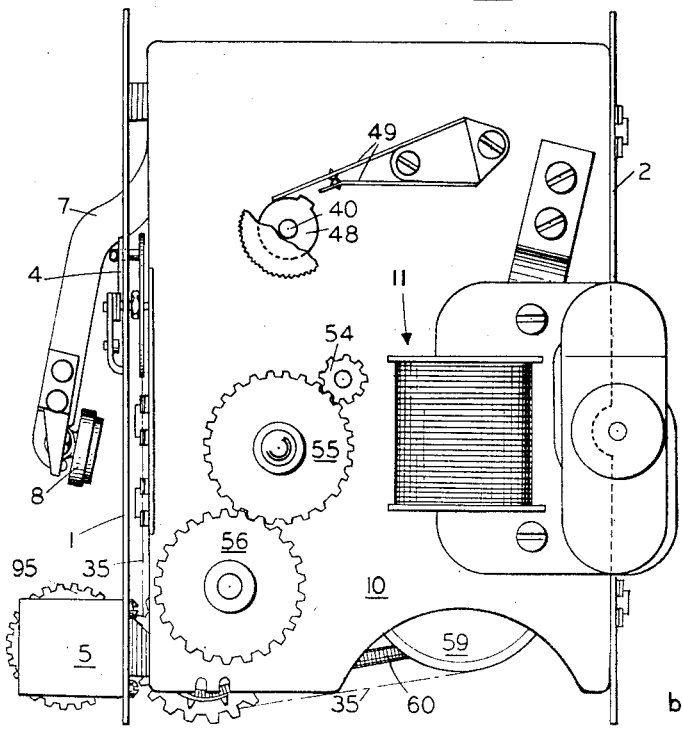
Inventor:
Paul V. Terry
by James E. Wrose
His Attorney Inventor:
Paul V. Terry
by James E. Wrose
His Attorney Oct. 25, 1960      P. V. TERRY      2,957,743
PRINTING DEMAND METER
Filed Oct. 4, 1957      4 Sheets-Sheet 3
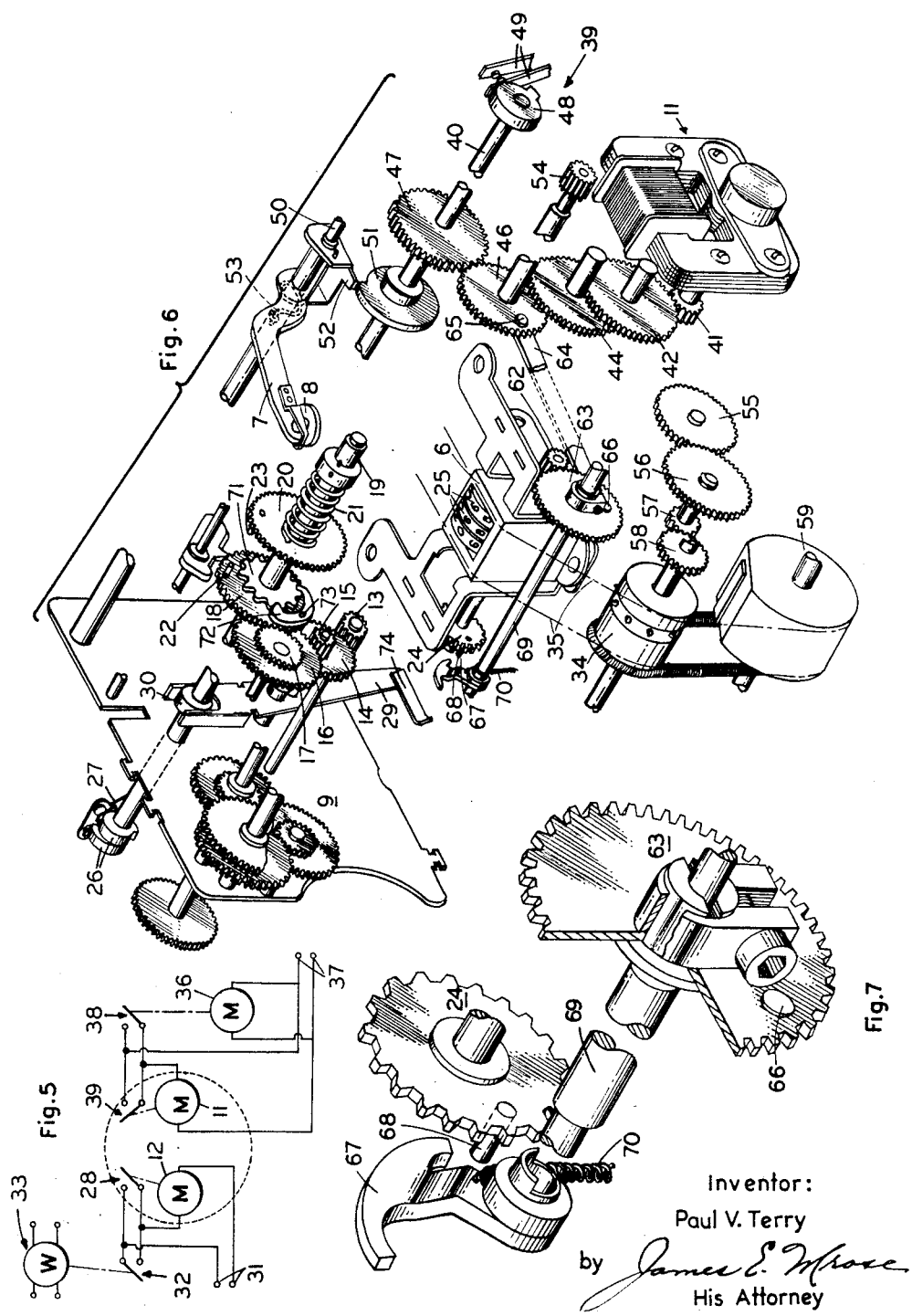
Inventor:
Paul V. Terry
by James E. Mrose
His Attorney Oct. 25, 1960
P. V. TERRY
2,957,743
PRINTING DEMAND METER
Filed Oct. 4, 1957
4 Sheets-Sheet 4
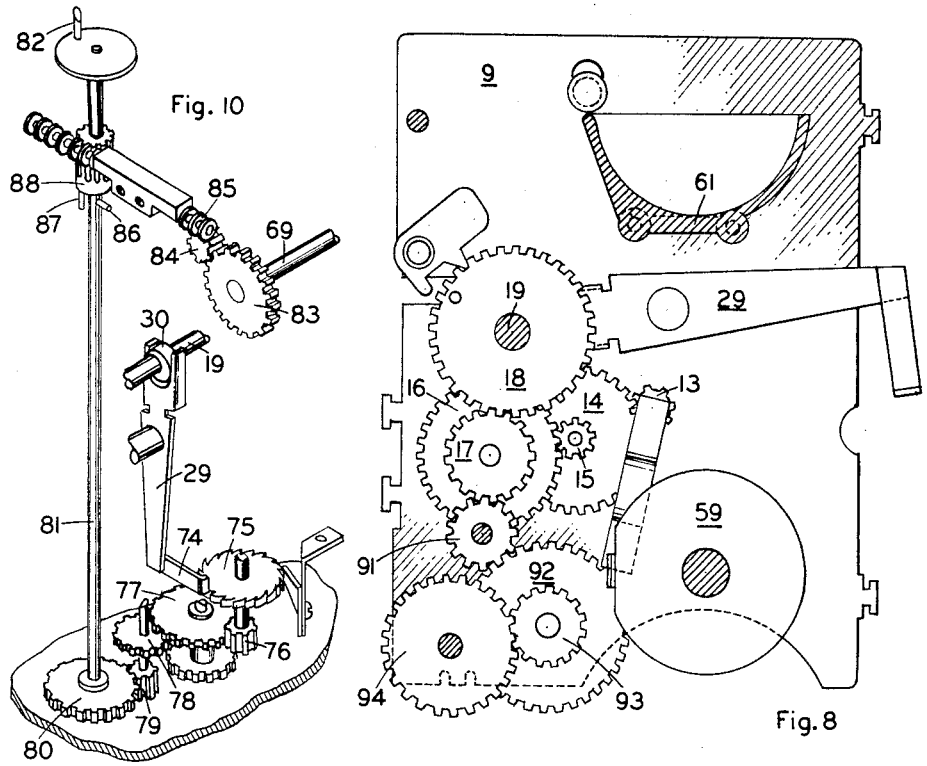
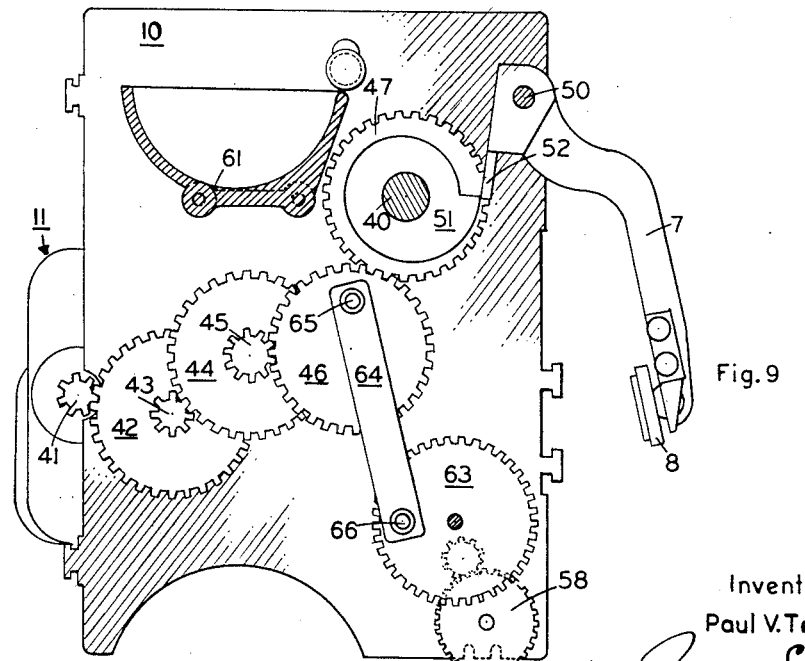
Inventor:
Paul V. Terry
by James E. Wrose
His Attorney

United States Patent Office 2,957,743
Patented Oct. 25, 1960

2,957,743
PRINTING DEMAND METER

Paul V. Terry, Eliot, Maine, assignor to General Electric Company, a corporation of New York Filed Oct. 4, 1957, Ser. No. 688,257

8 Claims. (Cl. 346—17)

The present invention relates to recording demand meters and, in one particular aspect, to improved printing demand metering apparatus which is accurately responsive to consumption of electrical energy.

It is well understood that the costs of generating and distributing electrical power may vary significantly with total short-term demands, and advantageous rates for such power can thus be offered to consumers whose requirements are arranged to bring optimum economy to such generation and distribution. In furtherance of this, it becomes necessary to meter and to preserve records of the power demanded by the customer at various times, and one form of device serving this purpose has included a counting type wheel cooperating with a tape on which metered power delivery is printed at given intervals. At the end of each demand interval, such devices print the demand data rapidly and then reset the printing counter to a zero registration as quickly as possible, whereby a further metered interval can commence with only minor loss in total power metered. Nevertheless, even these losses have seriously limited the best accuracies attainable with demand meters, and the values of energy which escape metering in this way can become substantial when connected loads are very large. Consumer requirements, particularly in industry, have further so heightened the peak demands likely to be experienced that demand meters must be capable of accepting and permanently registering information concerning amounts of energy vastly increased over those heretofore delivered in a fixed demand interval. As capacities are increased and the speeds with which the elements of the mechanism are forced to operate are increased also, the accuracy, legibility, wear, and maintenance characteristics are deleteriously affected.

Accordingly, it is one of the objects of the present invention to provide novel and improved apparatus for metering and recording data at high speed and without loss of information.

It is a further object to provide improved printing demand meter apparatus in which clear and highly precise records of electrical power consumption are promoted by information-saving mechanisms.

An additional object is to provide printing demand meters wherein multiple-function mechanically-synchronized elements occasion large metering capacities with high precision in low-cost dependable structures.

By way of a summary account of this invention in one of its aspects, each of a pair of motors having rotational outputs is utilized to power certain metering and printing operations in a printing demand meter. One of these motors is triggered into operation by counting impulses applied by a primary detector, such as a watthour meter in one application. This motor stops itself after rotating a predetermined angular amount, and the speed of rotation is selected such that a further impulse is not likely to be received from the detector before the motor movement ceases. A maximum demand pointer is advanced by a fixed amount by every such angular excursion of this motor, through a unidirectional coupling, and at the same time, each such angular excursion of the motor advances a resettable figure printing counter by a fixed amount, through a special spring-biased coupling which can perform a highly important data-storage function.

The other of the two motors is also caused to rotate through a predetermined angle and then to stop itself, under control of a timer which initiates the cycling after fixed time intervals have elapsed. Six events are controlled by each operating cycle of this motor: first, the mechanism for advancing the figure printing counter is locked in position, such that non-smear printing may take place; then a spring-biased platen is quickly hammered against a pressure-sensitive tape to cause the counter information to be registered on the tape; next, the counter is driven back to a zero registration; simultaneously, the maximum demand pointer drive is driven back to a zero position; simultaneously the printing counter is unlocked; and, all the while, the printing tape is slowly advanced across the counter type. Simple non-synchronous drive motors, and readily-produced gears, cams, and the like, make up the principal portions of the structure.

Although the features of this invention which are believed to be novel are set forth in the appended claims, greater detail and further objects and advantages thereof may be most readily comprehended through reference to the following description taken in connection with the accompanying drawings, wherein:

Figure 1 is a pictorial view of a printing demand meter embodying teachings of this invention, the view being taken from the front and a portion of the faceplate being broken away to expose certain of the mechanisms;

Figure 2:
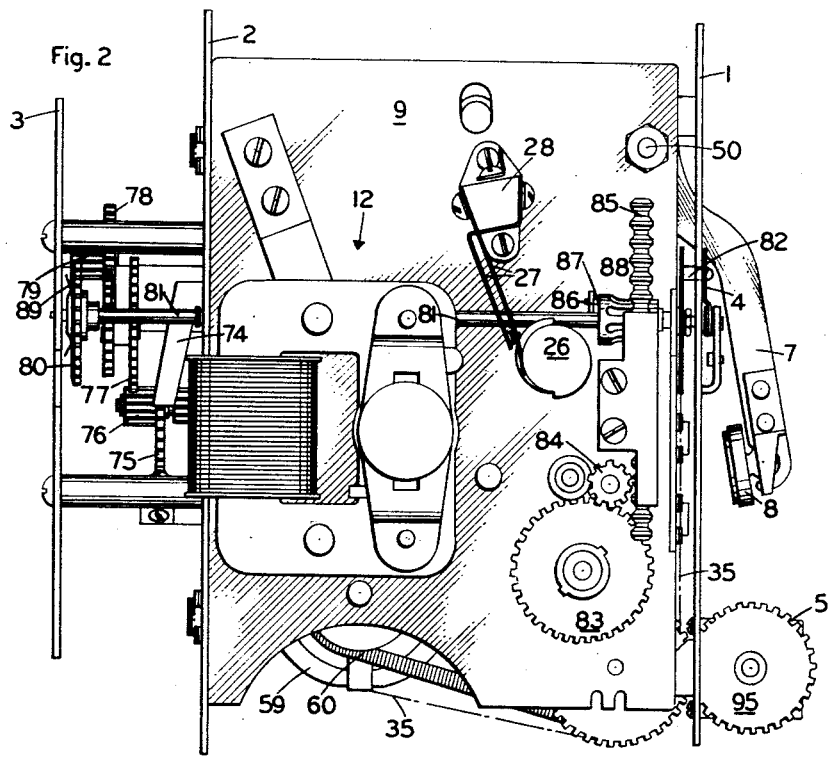
Figure 2 depicts the apparatus of Figure 1 as viewed from the left side thereof.
Figure 4:
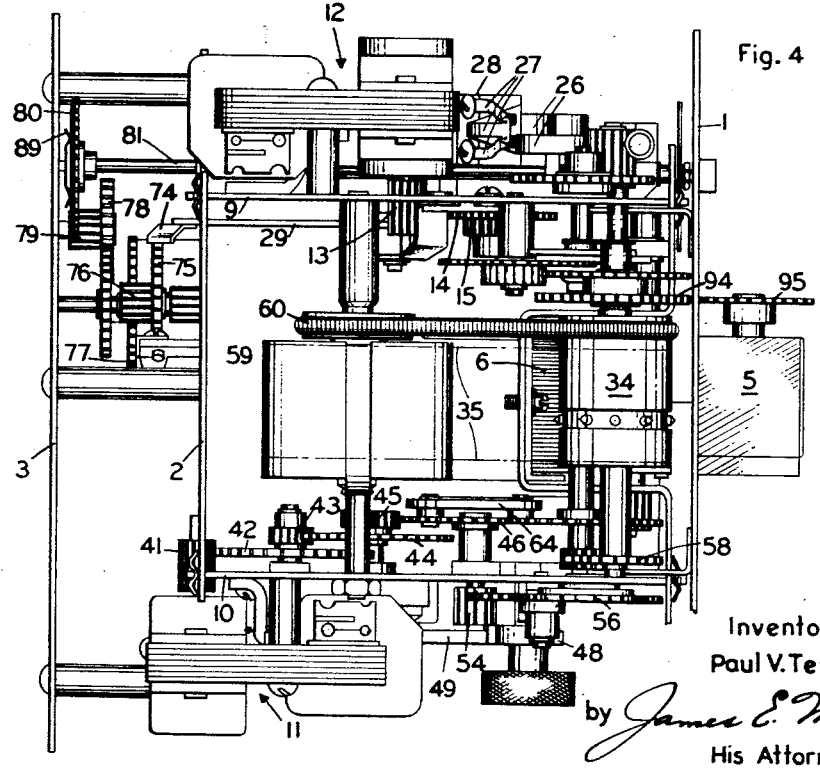

Figure 3 portrays the same apparatus as seen from the right side;

Figure 4 provides a view from the under side of the demand meter;

Figure 5 is a schematic electrical diagram of the demand meter in association with suitable detecting and timing elements;

Figure 6 is an exploded view of portions of the same mechanism illustrated in Figures 1–4;

Figure 7 illustrates certain counter locking elements, in enlargement;

Figure 8 shows a grouping of mechanical elements disposed on the inner side of one frame member of the meter;

Figure 9 shows a further grouping of mechanical elements disposed on the inner side of another frame member; and Figure 10 depicts the associated maximum demand indicator assembly, in perspective.

The illustrated assembly is one which may conveniently be affixed to a multi-terminal baseplate and enclosed by a cylindrical cup-shaped glass cover, in the style of common watthour meters, and the Figure 1 showing thus includes a faceplate 1 and backplates 2 and 3 which do not extend beyond a circular outline complementing that of a cover glass, not illustrated. Faceplate 1 serves also as a dial plate cooperating with a maximum demand pointer 4 and as a mount for a direct-indicating totalizing counter 5. Through a centrally-disposed aperture in the faceplate, the impressions last made on a pressure-sensitive record tape, not shown, may be viewed as the tape is advanced past a figure printing counter 6. It is not essential that the record tape be of the aforesaid pressure-sensitive character, however, and other arrangements utilizing ink, carbon paper, and the like, will also yield the permanent records of electrical demand which it is a major purpose of this device to produce. Printing platen 8 carried by movable printing arm 7 is poised for hammer-like movements toward the raised type on demand counter 6, whereby the counter figures will appear upon the intermediate pressure-sensitive tape. One suitable tape for the aforesaid purpose may include a paper backing having a dark coating and a superpositioned opaque film which becomes transparent to expose the dark coating when sufficient pressure is applied, and reference may be had to U.S. Patent 2,299,991 in this connection. For a more complete description of the platen 8 together with the manner in which it is mounted on printing arm 7, reference will be had to the co-pending application of Paul V. Terry entitled "Condition Recording Apparatus" filed December 26, 1956, Serial No. 630,688, now Patent No. 2,887,043, issued May 19, 1959, and assigned to the assignee of the present invention.

It is an important feature of this compact demand meter construction that solenoids and mechanisms uniquely associated with solenoid-actuated equipment are absent and that motive power for actuation of elements of the demand meter is derived from two electric motors having well-known stator and rotatable armature constructions. These motors are conveniently mounted one on each outer side of two frame members 9 and 10 which extend between backplate 2 and faceplate 1. One of these motors, 11, which is actuated in response to a clock or other timer, furnishes the motive power for the printing, locking, tape drive, and resetting operations which are described in detail later herein. The other motor, 12, responds to impulses from a detector, such as a watt-hour meter, which characterize the data or other intelligence under measurement. The mounting of reset motor 11 on frame member 10 is illustrated in Figures 1, 3, and 4, and the mounting of impulse motor 12 on the opposite frame member 9 is portrayed in Figures 2 and 4.

Considering first the operating effects of the impulse motor 12, which may be a non-synchronous motor, such as a shaded-pole motor, it will be understood that this motor will be coupled with an energizing A.-C. source upon the closing of a switch in circuitry external to the illustrated demand meter mechanism described thus far. For example, a watthour meter may actuate a sensitive relay to close this circuit at intervals independent upon speed of rotation of the watthour meter disk. Thus, an outside impulse is effective to energize motor 12 and to cause the rotor thereof to turn a pinion 13, viewed in Figures 4, 6, and 8. Power flow may be traced from pinion 13 to gears 14, 15, 16, 17, and 18, the latter gear being affixed in driving relationship to a shaft 19 supported by frame members 9 and 10.

With particular reference to the exploded view of Figure 6, it should be observed that while the gear 18 is rigidly affixed in driving relationship to shaft 19, the gear 20 on this same shaft is not fixed thereon but, instead, it is coupled to shaft 19 resiliently through a helical spring 21 wound about this shaft. One end of spring 21 is secured to shaft 19 and the other end to gear 20, with the helical coil being wound to permit at least one complete revolution of relative angular movement between the shaft and gear 20. It will be observed further that gears 18 and 20, which are disposed proximately to one another, possess stop pins 22 and 23, respectively, disposed to interfere with one another and thus to prevent more than a full turn of relative angular motion between gears 18 and 20. This double gear, stop pin, and spring assembly furnish part of a highly important data-storage unit which prevents loss of information which should be recorded by printing counter 6. The drive gear 24 which advances the type wheels 25 of counter 6 is meshed with and driven by the spring-biased gear 20. The gear and motor frictions involved in the aforesaid power flow path are such that gear 18 will move readily only in one direction, under influence of motor 12. Thus, gear 18 is not rotated in a backward direction to its normal movement by force of the stop pin 23 on gear 20. Gear 20 is actually in the nature of a follower gear, in that its drive spring 21 is pre-stressed to cause the stop pin 23 to abut against the stop pin 22 on drive gear 18. As gear 18 is moved in its forward or driving direction, the gear 20 thus tends to follow it, although as is later discussed, such following movement may be interrupted for short times. The pre-stressing of helical spring 21 is of such value that it will overcome all torques in the counter mechanism driven by gear 20 in returning stop pin 23 to an abutting relationship to stop pin 22 when these two pins have been angularly displaced from one another.

The driven shaft 19 also rotates a pair of switching cams 26, which are conveniently disposed on the outer side of frame member 9 and which cooperate with the switch leaves 27 of a control switch 28. This switch and switching cam arrangement serve to interrupt rotation of the drive motor of the aforesaid gearing after predetermined angular movements have been realized following receipt of a control impulse from an outside detector. A further operation which is under control of movements of shaft 19 is movement of the maximum demand pointer 4, Figure 1, this being responsive to rocking movements of the lever 29 pivoted on frame member 9 and oscillated by cam 30 affixed to shaft 19.

A portion of the schematic diagram presented in Figure 5 aids in understanding of the intermittent operation of the mechanisms responsive to impulse motor 12. It will be observed that motor 12 is coupled for A.-C. excitation from across source terminals 31 through a pair of switches 28 and 32. The non-synchronous motor 12 cannot rotate unless one or both of the switches 32 and 28 is closed. The switch 32 is actuated to momentary closures by a detector 33 which responds to the phenomena which is to be metered and recorded. While it should be understood that the detector 33 may constitute another form of device, such as a nuclear particle detector or vehicular traffic detector, the particular representation thereof chosen for discussion is that of a watthour meter, the output shaft of which has a low-friction switch 32 associated with it. As the watthour meter disk rotates, the associated switch 32 is closed and couples an impulse of current through motor 12. The response of motor 12 being particularly rapid, its associated cammed switch 28, which was set open, then was quickly closed. Although the watthour meter switch 32 opens shortly thereafter, the cammed switch 28 maintains the circuit through motor 12 in a closed condition until the cams 26 have been moved through a predetermined angle and automatically stop motor 12 by opening switch 28. At such a time, the impulse motor 12 is then readied for another comparable cycling by momentary closure of the detector switch 32.

The cams 26 and the gear 13 through 18 are selected such that gear 18 and the associated shaft 19 and cam 26 will rotate one-half revolution for each impulse received from detector 33. It is understood of course that the impulse may comprise momentary closure of switch 32 or may actually comprise a low level electric signal which would close a sensitive relay switch corresponding to switch 32. The follower gear 20 will likewise rotate one-half turn for each applied impulse, although its enmeshed gear 24 rotating the counter 6 will thereby be caused to rotate through one full turn and will advance the count of type wheels 25 by one figure for each applied impulse. Counter 6 thus indicates directly the number of impulses received.

In the detailed description as it has proceeded thus far, it has been related how each impulse applied from a detector causes an impulse motor to turn through a predetermined angle before shutting itself off, and how this rotation will advance a counter to display the number of impulses applied. In addition, it has been noted that movements taking place responsive to receipt of these impulses are also effective to oscillate a lever 29 a number of times proportioned to the number of impulses received. For the moment, the maximum demand registration which responds to these lever movements is not further described, although it appears later herein. The number of impulses which are registered by the counter 6 is significant only in terms of the elapsed time during which the impulses have been received, that is, the counter 6 is not intended to totalize all impulses but, instead, to totalize those occurring in brief intervals such as 15-minute intervals. In this way, the counter registers demand at various times during the day, in the case of electric power measurement. A permanent record of the impulses occurring in each 15-minute interval is impressed upon the record tape, and this necessitates a resetting of the counter back to zero after each impression is taken.

The actual printing action and the resetting of the counter to a zero registration consume a certain amount of time during which the counter cannot be advanced by incoming impulse data, and such data would not be registered were it not for the data-storage or accumulator mechanism including gears 18 and 20, stop pins 22 and 23, and the helical spring 21. In Figure 6, for example, the path of a record tape being advanced across the figure printing counter 6 by a sprocket 34 is outlined by the dashed lines 35. When a predetermined interval of time has elapsed, such as the aforesaid 15-minute interval, that portion of the tape which overlays the counter wheels 25 will be hammered against the type on these wheels by the platen 8 moved in hammerlike fashion by the printing arm 7. In the apparatus being described, the drive sprocket 34 for the record tape is in motion, and the tape being used is being advanced, at the instant when the printing platen 8 is actuated, although the printing action is accomplished so swiftly that the imprint upon the tape is not blurred or otherwise distorted. However, it is essential to the recording of legible data that the type wheels 25 of the demand counter 6 not be in motion or have their type figures out of alignment with the proper output positions. Accordingly, the mechanisms about to be described will serve to lock the demand counter against motion of its type wheels while the printing action is taking place. And, it may now better be perceived that such locking occasions need for the data-storage or accumulator unit referred to earlier herein.

Printing, resetting of the demand counter, and drive for a record tape are under control of a clock or other timer element, such as synchronous motor 36 energized from A.-C. source terminals 37 in Figure 5. The timer 36 is of a contact-making type including an electrical switch 38, and in one practice of the invention, the switch 38 would be closed for a time by motor 36 accurately at 15-minute intervals. Further reference to the same figure shows that the other non-synchronous shaded-pole motor 11 is coupled for excitation by source 37 through the timer switch 38 and a paralleled cammed switch 39, the latter switch being part of the illustrated demand meter assembly in Figures 1, 3, 4, and 6. The contact-maknig timer involving motor 36 and switch 38 may be affixed to the demand meter framework or may be located remotely in relation to it. The non-synchronous motor 11 is affixed to the right frame member 10 as has already been pointing out, and drives a cam shaft 40 through the gear train commencing with motor pinion 41 and continuing through the separately-numbered gears ending with gear 47 affixed to cam shaft 40. Cam shaft 40 carries a cam 48 which actuates the switch leaves 49 of the cammed switch 39, the cam 48 being rotated through a single revolution responsive to each of the reset signals applied by the timer at 15-minute intervals. Referring once more to the schematic diagram in Figure 5 in this connection, it will be observed that momentary closure of timer switch 38 will cause excitation of the reset motor 11 whereupon switch 39 becomes closed and remains closed until the associated cam 48 completes one revolution and opens the switch 39 to shut off the motor 11.

It should thus be apparent that at predetermined intervals the reset motor 11 will deliver rotating mechanical output for but a brief period and then stop itself. In each such cycle, the rotatable mechanical outputs of this motor are effective (*a*) to actuate the printing platen, (*b*) to actuate a drive mechanism for a record tape, (*c*) to reset the demand counter to zero after printing occurs, (*d*) to preserve the printing counter in a locked condition during the printing and resetting actions, and (*e*) to reset a drive for a maximum demand indicator. Considering first the actuation of the printing platen, reference to Figures 6 and 9 will disclose that the platen arm 7 may be oscillated about a support shaft 50 responsive to movements of the cam 51 on the cam shaft 40. The shaft 40 travels through one revolution for each timing interval, and the cam follower 52 will drop to cause a sudden hammer-like movement of printing arm 7 and printing platen 8 at a predetermined portion of each turn or shaft 40. The cam follower 52, which guides the movements of the printing arm 7, is strongly biased by a spring 53 such that the platen 8 tends to move in a direction of a demand counter 6. Spring 53 is shown connected between the follower 52 and the fixed shaft 50 on which the follower can move and develops a large return torque for small angular displacement thereof. Preferably, this spring 53 is arranged to hold the printing platen 8 just out of contact with the type on counter wheels 25 when the follower 52 rides upon the smallest-diameter portion of cam 51. This slight spacing prevents accidental smearing of the record tape because inertia developed by the mass of platen arm 7 and platen 8 as follower 52 drops off the highest portion of 51 is high enough to cause the platen to strike the counter type momentarily with great force and then to space itself from the type.

Second, the reset motor 11 operates a record tape drive during each of its operating cycles. In this manner, the record tape is advanced by a predetermined amount such that successive printings thereon will not overlap. The mechanisms which accomplish this record drive may be best perceived in Figures 4 and 6, it being noted that a pinion 54 rotatable with gear 46 will mesh with gear 55 and drive sprocket 34 through the gears 56, 57, and 58. A record tape reroll spool 59 is rotated, in turn, by a garter spring 60. In another portion of the assembly, a supply roll of tape is accompanied by a semi-cylindrical trough 61.

A third action controlled by the reset motor 11 is that of resetting the printing counter 6 back to zero after each printing. Figure printing counter 6 is of a known type which can have its figures advanced when the drive gear 24 is moved in one angular direction and which will have all of the type wheels 25 set back to zero only when another drive gear 62 is moved in a particular angular direction. The occurrence of angular movement of the counter reset gear 62 at a particular portion of the reset motor cycling is insured by operation of a reciprocating gear 63 actuated by a linkage arm 64. One end of linkage arm 64 is loosely mounted on a pin 65 fixed with gear 46, and the other end of the linkage arm is similarly mounted on a pin 66 fixed with the reciprocating gear 63. As gear 46 is caused to rotate once during each cycle of the operation of motor 11, it moves the linkage arm 64 back and forth and oscillates gear 63 through a small angle. During each full oscillation of the gear 63, the counter reset gear 62 is first moved in one angular direction without any effect on the counter and is next moved in the predetermined angular direction which resets the counter figures to zero.

A fourth operation powered by each cycling of reset motor 11 is that of locking the printing counter 6 during occurrence of the printing and resetting actions.

This locking is effective only on mechanisms which could advance the counter registration by turning the type wheels 25, and the locking action is arranged to take place earlier in each cycling of motor 11 than do the printing and resetting operations. Part of the printing counter resetting mechanism is in fact useful as a drive for the locking elements, the latter elements including an arcuate stop 67 which is disposed for rocking into and out of interfering relationship with a stop pin 68 on the counter drive gear 24. Inasmuch as the arcuate stop 67 is actuated by the shaft 69 to which the oscillating reset gear 63 is fixed, this stop will be caused to move angularly back and forth through a relatively small angle, such as 90°, in the manner of gear 63 once during each cycling of reset motor 11. Figure 6 and the enlarged fragmentary showing in Figure 7 make it clear that the stop members 67 and 68 can interfere to prevent impulses from being registered on counter 6, although only during that part of the cycling of motor 11 when the printing and resetting take place. Some relative angular movement between arcuate stop 67 and its actuating shaft 69 is permitted by a limited-freedom mounting of stop 67 on this shaft under restraint of a spring 70. This restrained mounting insures that even if the stops become locked as the result of but little angular movement of the arcuate stop 67, as may happen when the stops are initially in certain relative positions, the reciprocating reset gear 63 may nevertheless oscillate through the full 90° angle which is needed for positive resetting of the demand counter to zero registration.

Locking of the printing counter 6 in the aforesaid manner would be expected to prohibit registration of input impulses from a detector during the printing and resetting periods, with attendant loss of valuable data. However, even though counter drive gear 24 and the enmeshed gear 20 (Figure 6) cannot rotate during the locking periods, the gear 18 and those gears intermediate it and the impulse motor pinion 13 can rotate. This is true because of the nature of the coupling between gears 18 and 20. It will be recalled that gear 20 follows gear 18, under influence of the helical spring 21, tending to keep the stop pins in abutting relationship. During the locking periods, however, the gear 18 and its stop pin 22 may advance through substantially a full revolution in response to applied impulses while the spring-biased gear 20 remains stationary and its spring 21 becomes more tightly wound. Upon release of stop pin 68 on counter gear 24 by appropriate rocking movement of arcuate stop 67, the gear 20 will tend to rotate under influence of spring 21 until its stop 23 abuts the stop 22 on gear 18. In this way, gear 20 follows gear 18 to make up for motion lost during the locking periods, and such rotation of gear 20 will turn counter gear 24 and cause registration of the impulses not theretofore counted. Thus, the impulses are accumulated for subsequent automatic registration rather than being lost. Because of the tendency toward a rapid following action of gear 20 after spring 21 is tightly wound, with attendant impact and wear problems, it is advantageous that a governor or other high inertia mechanism limit the speed of permissible movement of gear 20. A governor is depicted in Figure 6 as comprising a pinion 71 and at least one cooperating weight 72 in the shape of an escapement member. Pinion 71 is rigidly affixed to follower gear 20, although the exploded view does not permit optimum portrayal of this, and weight 72 is pivoted on gear 18 at 73. As follower gear 20 seeks to release the accumulated or stored data by rotating rapidly in relation to gear 18, the escapement weight 72 must be rocked at high speed by the pinion 71, and the inertia of weight 72 which must be overcome in this process is sufficient to preserve the speed of gear 20 at a satisfactorily low value.

A further operation controlled by cycling of the reset motor 11 involves a periodic resetting to zero of the drive for maximum demand pointer 4 (Figure 1). It has already been noted that the lever 29 is oscillated once for each two impulses which actuate the impulse motor 12, and it may now be perceived in Figure 10 that the advancing pawl 74 on the end of this lever serves to advance gears 75 through 80, and a demand shaft 81 and pin 82, by fixed amounts as impulses are applied for metering. Pin 82 tends to drive the pointer 4 (Figure 1) upscale during each demand interval, and the maximum number of detector signals applied to the meter in any one interval should be represented by pointer 4. However, this will not be the case unless drive pin 82 is reset to an initial or zero position before each interval commences. Such resetting is in fact effected by the reciprocating motion of shaft 69 driven by reset motor 11, the motion of shaft 69 being employed to oscillate gear 83 and pinion 84. A round rack 85 is moved back and forth by oscillating pinion 84, and this rack causes the stop pins 86 and 87 on the demand shaft 81 and a relatively movable pinion 88 on this shaft to engage and force the demand shaft pin 82 back to a zero position. A simple friction clutch member 89 (Figures 2 and 4) intermediate demand shaft 81 and its drive gear 80 permits the resetting of pin 82 to occur without reflecting undesired forces in the impulse mechanisms. Pointer 4 may itself be reset to a zero position manually after the observer has noted its reading against suitable indicia 90 on faceplate 1 (Figure 1).

Totalizing counter 5 mounted on faceplate 1 is of a direct-reading construction and indicates the total number of detector impulses received. It is actuated very simply by the gears 81 through 95 (Figures 2 and 8) which derive power initially from motor pinion 13. Because the data-storage or accumulator mechanism described earlier herein does not occasion a locking of the impulse motor mechanisms, the totalizing counter 5 does not lose registration of any incoming data at any time. As a result of this, the accuracy of totalized data indicated by counter 5 is comparable to that of the detector which actuates impulse motor 12. In the case where an electrical watthour meter serves as the detector, the registration on counter 5 is thus of about the same accuracy as the registration on the watthour meter itself, and the two devices can verify one another.

Apparatus selected for illustration and description in this application is not intended to impose limitations, and those skilled in the art will understand that various changes, modifications, and substitutions may be achieved without departure in spirit or scope from the invention as set forth in the appended claims.

What I claim as new and desire to secure by Letters Patent of the United States is:

1. A printing demand meter comprising a first electric motor connected to rotate unidirectionally through a predetermined angle responsive to each of input signals applied thereto, a rotatably mounted shaft, a first gear affixed to said shaft, said first gear having first stop means affixed thereto, said first gear being driven by said first motor to thereby rotate said shaft, a second gear rotatably mounted on said shaft, said second gear having second stop means affixed thereto, a helical spring surrounding said shaft and having one end affixed thereto, the other end of said spring being affixed to said second gear, said spring being pre-stressed so as to urged said second stop means against said first stop means whereby said second gear follows said first gear upon rotation thereof, counter means driven by said second gear, a timed electric motor, and means periodically actuated by said timed motor to lock and unlock said counter means for an interval, said second gear being locked when said counter is locked to allow said first gear to move away from said second gear and wind up said spring, said spring unwinding when said counter is unlocked to drive said second gear until it catches up with said first gear at which point said stop means are together.

2. A printing demand meter comprising a first electric motor connected to rotate unidirectionally through a predetermined angle responsive to each of input signals applied thereto, a rotatably mounted shaft, a first gear affixed to said shaft, said first gear having first stop means affixed thereto and being driven by said first motor to thereby rotate said shaft, a second gear rotatably mounted on said shaft, said second gear having second stop means affixed thereto, a helical spring surrounding said shaft and having one end affixed thereto, the other end of said spring being affixed to said second gear, said spring being pre-stressed so as to urge said second gear means against said first stop means whereby said second gear follows said first gear upon rotation thereof, counter means driven by said second gear, a timed electric motor, first means periodically actuated by said timed motor to lock and unlock said counter means for an interval, and second means actuated by said timed motor recording the indications of said counter means periodically and during intervals when said first means locks said counter means, said second gear being locked when said counter is locked to allow said first gear to move away from said second gear and wind up said spring, said spring unwinding when said counter is unlocked to drive said second gear until it catches up with said first gear at which point said stop means are together.

3. The invention defined by claim 2 wherein third means are periodically actuated by said timed motor to set said counter means to zero indication during said interval and subsequent to recording by said second means.

4. A recording meter comprising first and second electric motors each arranged to rotate through an angle and then to stop responsive to momentary switch closures by a watthour meter and timer, respectively, demand counter means, a totalizing counter actuated by said first motor, a maximum demand index, a unidirectional drive for said index, slip clutch means coupling said index drive for actuation by said first motor, a first coupling element actuated by said first motor, a second coupling element disposed in driving relationship to said demand counter means, resilient means urging said second coupling element to follow movements of said first element and to assume a predetermined relationship therewith, means actuated by said second motor periodically locking and unlocking said demand counter means and said second coupling element for an interval, means actuated periodically by said second motor to record the indications of said demand counter means during said interval, and means actuated periodically by said second motor to reset said demand counter means and said maximum demand index drive to zero positions.

5. A printing electrical demand meter comprising first and second electric motors each arranged to rotate through an angle and then to stop responsive to momentary switch closures by a watthour meter and timer, respectively, a rotatable demand counter including type wheels, rotatable means coupling said first motor in driving relation to said counter, a printing platen, means including a cam actuated by said second motor for periodically moving said platen to perform a printing operation with said counter wheels, means periodically actuated by said second motor converting rotative movements therefrom into oscillatory angular movements, locking means periodically locking and unlocking said counter responsive to said periodic oscillatory movements, and means resetting said counter wheels to predetermined positions responsive to said periodic oscillatory movements, said locking means being disposed to lock said counter during said printing operation and said resetting, and said resetting means being adjusted to reset said counter wheels after each said printing operation.

6. A printing electrical demand meter comprising first and second non-synchronous electric motors each arranged to rotate through an angle and then to stop responsive to switch closures by a watthour meter and timer, respectively, a rotatable demand counter including type wheels, a totalizing counter actuated by said first motor, a maximum demand indicator, a unidirectional drive for said indicator, slip clutch means coupling said indicator drive for actuation by said first motor, a first rotatable coupling element actuated by said first motor, a second rotatable coupling element disposed in driving relationship to said demand counter, means resiliently urging said second coupling element to follow angular movements of said first element and to assume a predetermined angular relationship therewith, a printing platen assembly, means including a cam actuated by said second motor for periodically moving said platen assembly to perform a printing operation with said counter wheels, means periodically actuated by said second motor converting rotative movements therefrom into oscillatory angular movements, locking means periodically locking and unlocking said demand counter and second coupling element responsive to said periodic oscillatory movements, means resetting said counter wheels and said indicator drive to zero positions responsive to said periodic oscillatory movements, said locking means locking said demand counter during said printing operation and said resetting, and said resetting means resetting said counter wheels and indicator drive after each said printing operation.

7. A printing electrical demand meter as set forth in claim 6 wherein said means for moving said printing platen assembly includes a cam follower, a stiff spring cam biasing said cam follower against said cam to position said platen assembly normally out of contact with said type wheels, said cam being shaped to cause said spring to wind and suddenly force said platen assembly momentarily against said type wheels under influence of momentum of said platen assembly, and further including means periodically actuated by said second motor for driving a record tape intermediate said type wheels and platen assembly.

8. The invention defined by claim 1 further comprising a governor mechanism including a pinion affixed to said second gear, and a weighted escapement member mounted on said first gear for escapement movements with said pinion whereby speed of relative motion between said gears is limited.

References Cited in the file of this patent

UNITED STATES PATENTS

| | | |
|---|---|---|
| 1,166,596 | Johnson | Jan. 4, 1916 |
| 2,229,696 | Engst | Jan. 28, 1941 |
| 2,414,821 | Levey et al. | Jan. 28, 1947 |
| 2,539,835 | Heynisch | June 30, 1951 |
| 2,679,357 | Rosenberger | May 25, 1954 |
| 2,730,425 | Braatz | Jan. 10, 1956 |
| 2,746,318 | Benjamin | May 22, 1956 |
| 2,778,707 | Webster | Jan. 22, 1957 |